INVENTORS
Wilhelm Renz
Hans Wacker

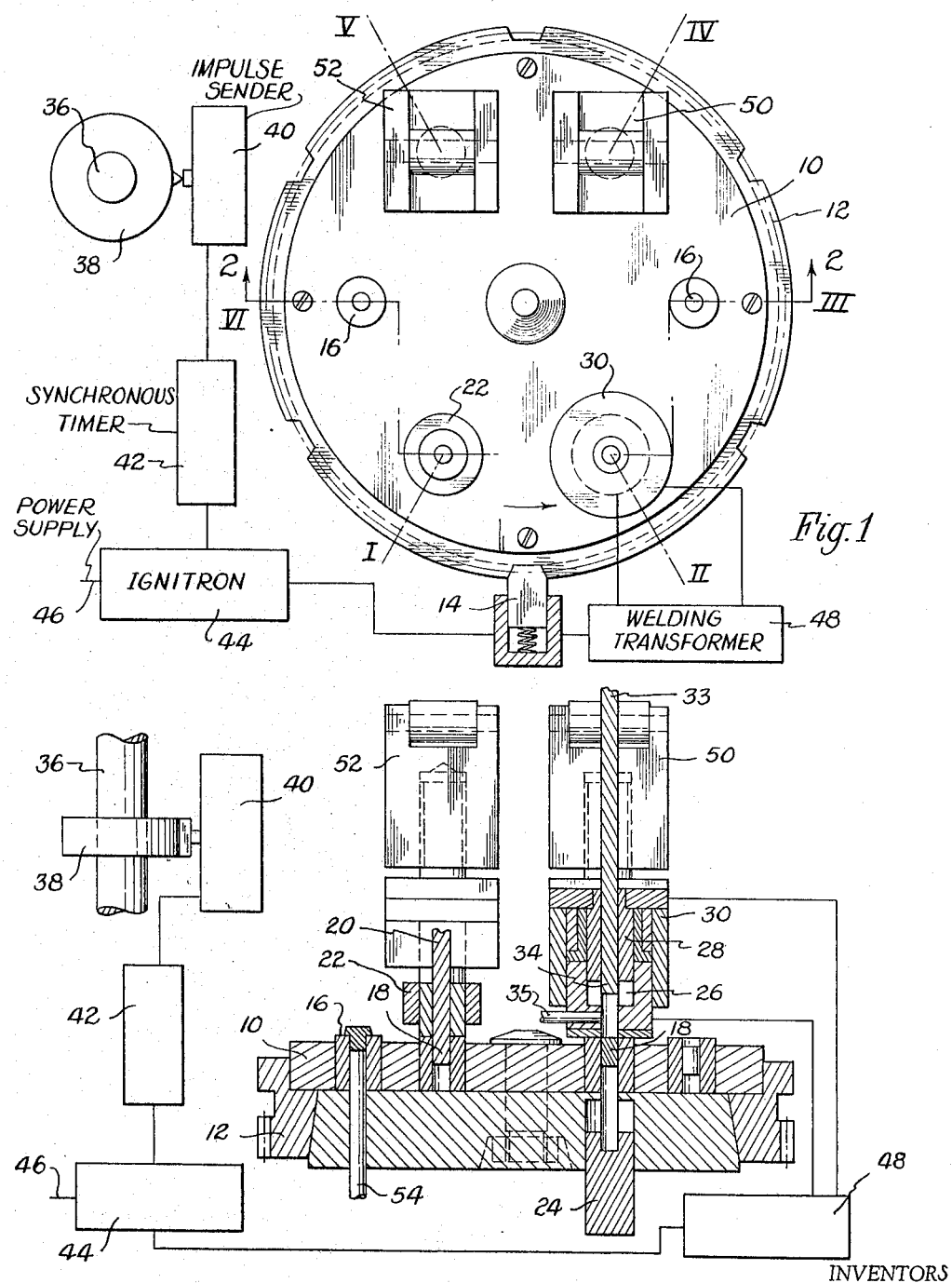

BY Bailey, Stephens and Huettig
ATTORNEYS

United States Patent Office

3,279,505
Patented Oct. 18, 1966

3,279,505
APPARATUS FOR WELDING BIMETALLIC
CONTACTS
Wilhelm Renz, Pforzheim, and Hans Wacker, Heidelberg, Germany; Elsa Renz and Hans-Jürgen Renz, heirs of said Wilhelm Renz, deceased, and said Wacker assignors to Renz, Wacker & Co., Calmbach (Enz), Germany
Filed May 13, 1963, Ser. No. 280,041
Claims priority, application Germany, May 16, 1962, R 3,210
4 Claims. (Cl. 140—112)

This invention relates to an apparatus for producing welded bimetallic contacts and, in particular, to resistance welded contacts.

Rivet-making machines are known which have a rotating turntable carrying shearing dies adapted to receive pieces of wire. A stationary element serves as a wire guide and and a knife edge so that the wire is sheared or cut off from the feed stroke as the die moves away from the stationary element. Opposite the stationary wire guide element is a pressing tool beneath which the dies pass in series.

The object of this invention is to adapt the basic structure of the known rivet-making machine to the electric resistance welding and hot forming of bimetallic contacts in a simple and economical manner.

In general, the objects of this invention are obtained by using a turntable having a plurality of wire receiving holes and used for bringing two wires into end to end contact and then butt welding the wires together by means of electrical resistance heating and finally finishing the formation of the bimetallic contact. The turntable has a plurality of holes adjacent its periphery, which holes in succession pass a plurality of forming stations. At the first station, the end portion of the length of a first wire is inserted through a wire guide into a hole in the turntable. The wire guide serves as a knife edge so that when the table is indexed to the next station the end portion of the first wire is sheared off and carried along in the hole. At the second station, the first wire is pushed outwardly into a heater chamber where it contacts the end portion of a second wire and is butt welded thereto by electrical resistance heating. The joined portions of the first and second wires are again pushed back into the hole and, as the table is indexed to the next station, the end portion of the second wire is sheared off and the welded first and second wires move to a plurality of following stations. In these last stations, a rivet head is formed on the second wire, the rivet given final shaping, and then the finished bimetallic contact ejected from the table.

The means by which the objects of the invention are obtained are described more fully with reference to the accompanying drawings in which:

FIGURE 1 is a plan view of the apparatus, including a schematic showing of the electrical welding circuit;

FIGURE 2 is a cross-sectional view taken on the line 2—2 of FIGURE 1 at the time the first wire is being pushed from a hole in the turntable to be brought into contact with a second wire;

Figure 3:
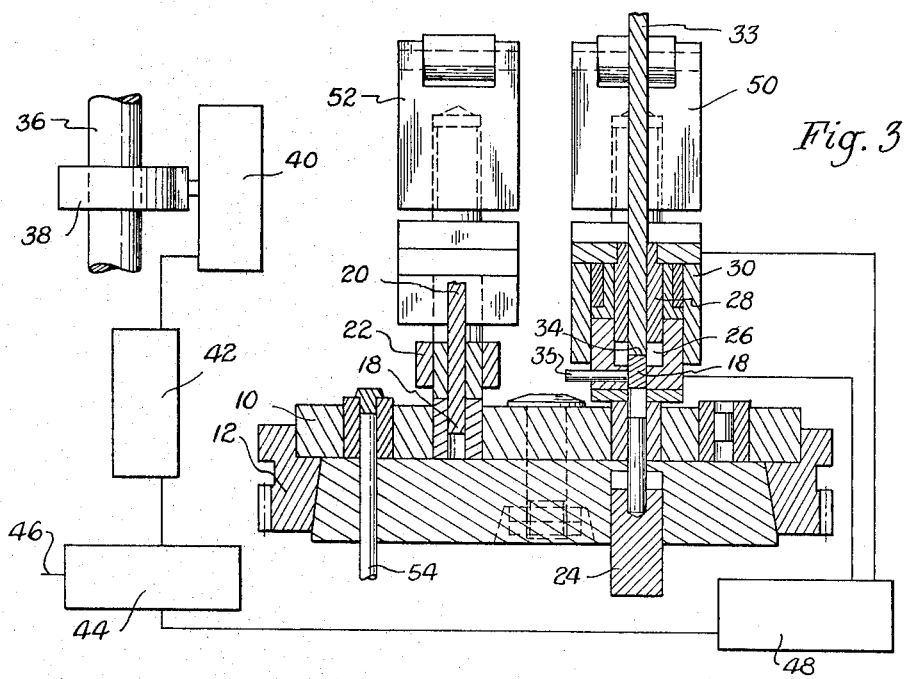
FIGURE 3 is a similar view at the time a first and second wire is being butt welded together.
Figure 4:
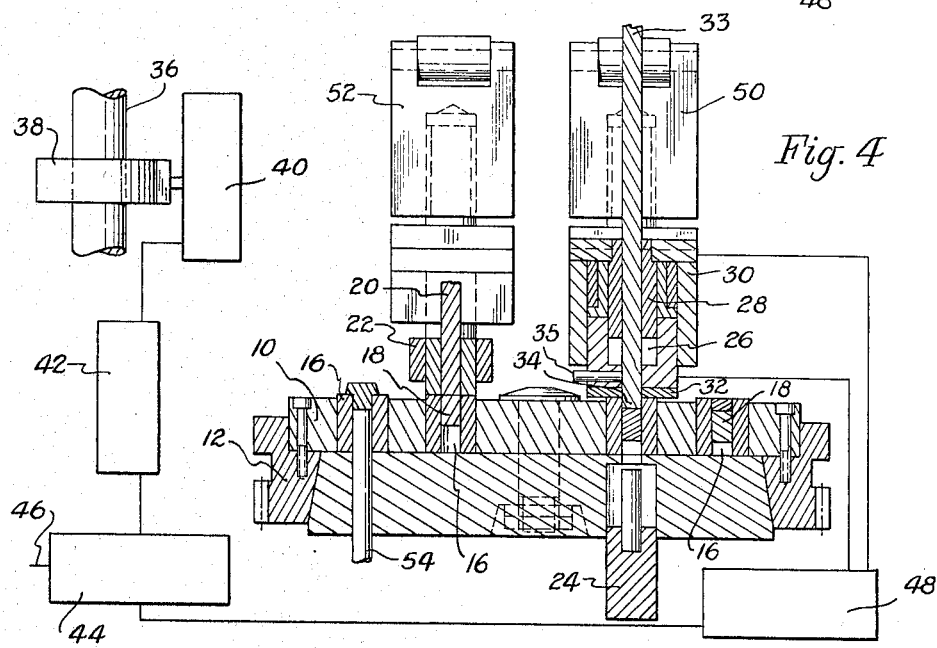
FIGURE 4 is a similar view taken at the time the butt welded wires are returned to the hole and just before the turntable is indexed to shear off a portion of the second wire.

Turntable 10 is enclosed by a ring gear 12 so that the table can be indexed from station to station. It is held at each station by a detent 14, FIGURE 1. Concentrically arranged on turntable 10 are a plurality of holes 16 which first serve to convey and cut off wire portions and then to act as dies for forming rivets. At station I, the end portion 18 of a first wire 20, for example, composed of copper, is inserted into hole 16. The length of wire is inserted through a stationary wire guide 22, the lower edge of which serves as a knife edge. Then as the turntable is indexed in the direction of the arrow, FIGURE 1, the end portion 18 of the wire is sheared off and carried along to station II.

Mounted below this station is a plunger 24 for the purpose of pushing the end portion 18 upwardly out of the hole and into a heating chamber. This stationary heating chamber 26 is composed of the second wire guide 28 insulated from an electrical conducting housing 30 and having a lower end 32 forming a knife edge or shearing element. The second wire 33, for example, composed of silver, is fed through wire guide 28 until its lower end portion 34 is in chamber 26. Plunger 24 pushes the first wire portion up into contact with the second wire, at which position the first wire is held by means of a clamping member 35. Plunger 24 then returns to its starting position.

The first and second wires are at this time butt welded together by means of electrical resistance heating. As schematically shown, shaft 36 rotates in time with turntable 10 and drives cam 38. This cam actuates a welding impulse sender 40 which sends a pulse through the synchronous timer 42 and ignitron 44 having a source of power 46 and through a welding transformer 48 to the wires in chamber 26. The welded wires are then lowered by pushing down on the silver wire 33 pressing the welded portions 18 and 34 back into the first hole. The table is then indexed and shears off the end portion of the second or silver wire so that the two welded wires are carried along to station III. A further indexing of the table brings the two wires to station IV above which is a rivet head forming member 50. At this station, a rivet head is formed on the welded bimetallic contact by means of an upsetting tool. The table is then indexed to station V above which is a final finishing tool member 52. A ram in this finishing member gives the freely shaped bimetallic contact its finished shape. The table is then indexed to station VI where a pin 54 rises upwardly through the hole to eject the finished bimetallic contact rivet. Simultaneously, the same operation occurs in each hole 16 following the first hole just described.

Figure 5:
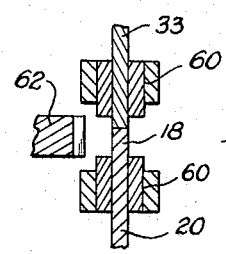
FIGURE 5 is a detailed view of a modification of the cutting of the welded bimetallic contact at station II.

In the modification of FIGURE 5, at station II the two wires 20 and 33 have had their ends welded together, the wires having been inserted through stationary wire guides 60. The welded wires are then sheared off by means of a transversely moving knife 62 and are transferred to station III of the turntable and from which the next indexing movement brings the welded wires beneath the rivet forming tool 50.

The result of this apparatus is that a finished bimetallic contact rivet is produced upon each indexing movement of the table. There is no dead motion, and the heat evolved in chamber 26 can be reduced to acceptable levels by means of either air or fluid cooling.

The advantages of this invention are in that the two wires are butt welded without the use of any electrodes and thus eliminate the maintenance problems created by the use of electrodes. Also, the welding operation takes place outside of the holes or dies 16 and therefore the dies are not subject to erosion, scaling, or wear caused by arcing. The dies 16 have only the normal wear associated with the manufacture of ordinary rivets. The operation is therefore, inexpensive. Also, because the length of wire between the welding transformer and welding chamber is relatively short, a smaller than ordinary transformer can be used which further reduces costs.

Having now described the means by which the objects of the invention are obtained,

We claim:

1. An apparatus for welding bimetallic contacts comprising turntable means adapted to be indexed to a plurality of stations, a plurality of wire receiving holes in said turntable means and spaced to place each hole at a single station, first stationary wire guide means for putting the end portion of a length of a first wire into a first hole at the first station and then shearing off said end portion by indexing said turntable means to bring said first hole to a second station, an electrical resistance heating chamber at said second station, means for inserting the end portion of a length of a second wire into said chamber, plunger means for pushing said first wire from said first hole into said chamber and against the end of said second wire, electrical means for butt welding said first wire by resistance heating, second stationary wire guide to said second wire, means for shearing off the end portion of said second wire welded to said first wire by indexing said turntable means to a third station, rivet head forming means at a fourth station for forming a rivet of the bimetallic welded wire in said first hole indexed to said fourth station, finish pressing ram means at a fifth station for final shaping said bimetallic rivet, and pin means at a sixth station for ejecting the finished bimetallic rivet from said first hole.

2. In an apparatus for welding bimetallic contacts having a turntable with holes, said turntable being indexable a plurality of stations for receiving two different wires in each hole, butt welding and then rivet finishing the wires, the improvement comprising an electrical resistance welding chamber above a first wire containing hole at the welding station, means for inserting the end portion of a length of a second wire into said chamber, and plunger means for pushing said first wire out of its hole and into contact with said second wire for being butt welded thereto.

3. In an apparatus as in claim 2, further comprising clamp means for holding said first wire in said chamber while being welded to said second wire.

4. In an apparatus as in claim 3, further comprising stationary shearing means for cutting off the end portion of said second wire as said turntable is indexed to move said hole containing the welded first and second wires to a subsequent station.

References Cited by the Examiner

UNITED STATES PATENTS

| 1,850,126 | 3/1932 | Bruckner | 219—57 |
| 2,395,721 | 2/1946 | Buchet | 10—11 |
| 2,579,117 | 12/1951 | Kremer | 140—112 |
| 2,662,597 | 12/1953 | Ballard et al. | 10—25 |

FOREIGN PATENTS 1,151,610   7/1963   Germany.

CHARLES W. LANHAM, *Primary Examiner.*

W. H. JUST, *Assistant Examiner.*